3,559,464
RHEOMETER FOR CONTINUOUS MONITORING OF A PLASTIC
Charles W. Foust, Berkeley Heights, and Wladimir Philippoff, Cranford, N.J., assignors to Esso Research and Engineering Company, a corporation of Delaware
Continuation of application Ser. No. 667,496, Sept. 13, 1967. This application Nov. 13, 1969, Ser. No. 871,618
Int. Cl. G01n 11/08
U.S. Cl. 73—55         6 Claims

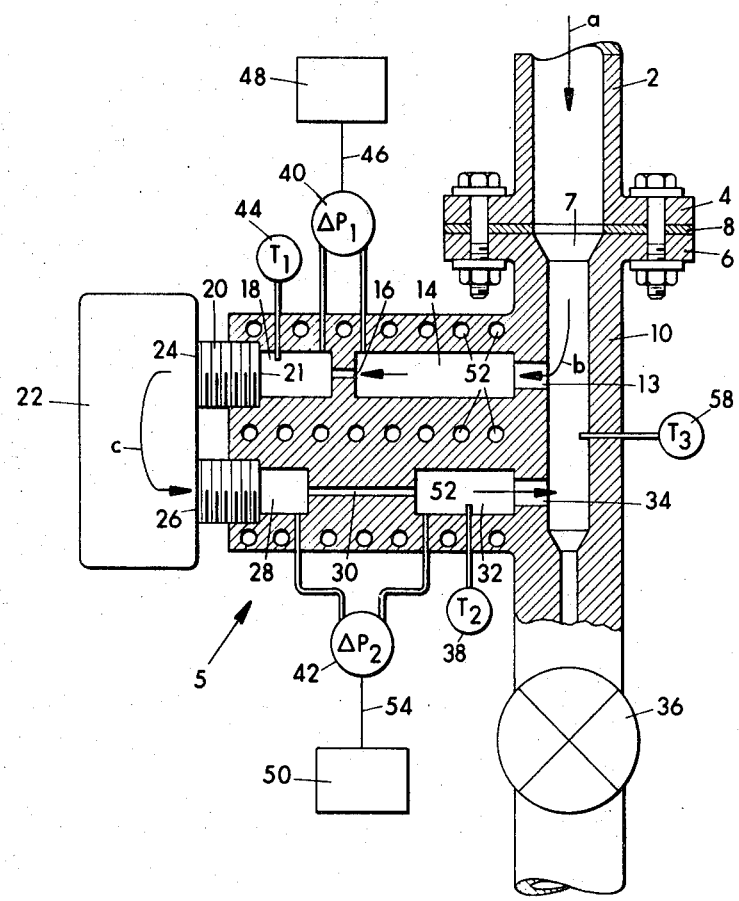

ABSTRACT OF THE DISCLOSURE

The viscosity and shear modulus of viscoelastic materials are determined by measuring the pressure drop across two capillary tubes in series connection. The second capillary tube is elongated, and both tubes are of uniform diameter throughout their lengths. The material is forced through the tubes by a gear pump at a known constant rate of shear independent of the viscosity of the viscoelastic material being tested.

CROSS REFERENCE

This is a streamlined continuation of patent application, Ser. No. 667,496, filed on Sept. 13, 1967 now abandoned.

FIELD OF THE INVENTION

This invention relates to rheology and to means and methods for characterizing a plastic material by determining its rheological properties. More particularly, the invention relates to an apparatus and method whereby the rheological properties of a plastic which may be a material such as polyethylene, polypropylene or the like may be continuously characterized or monitored.

Rheology is the study of the deformation and flow of materials subject to a stress. There are two basic types of deformation, elastic deformation which is temporary and disappears upon release of the stress and flow which is a permanent deformation. If a permanent deformation (flow) takes place, this means that particles within the body have slipped permanently past one another against the restraining action of the forces of interparticle attraction. This slippage is what is termed shear. As is well known in the art, plastics are among these types of materials which are characterized by the fact that they are viscoelastic in nature; that is, when subjected to a given stress, the resultant deformation is a composite, part of which is attributable to viscous flow (which is, of course, permanent in nature) while another part is elastic in nature and is recoverable with time upon release of the stress.

It is also established that since polymer melts, such as polypropylene, are viscoelastic materials, their properties can be ascertained by obtaining their shear modulus G and their viscosity $\eta$. The determination of these rheological properties is of extreme importance in characterizing commercial plastics and specifically those of the thermoplastic variety, for these properties dictate the particular application these materials will be best suited for. For example, thermoplastic resins which are to be used for extrusion may have very different viscoelastic properties than those which will be used for injection molding. Furthermore, the determination of the viscosity and shear modulus allow calculations to be made which lead to useful information as to the average molecular weight and molecular weight distribution of the polymer under study. This type of data is of particular concern during the manufacture of a particular plastic or where it is desired to produce a material having certain characteristics by blending various grades of plastics together.

The instant invention is directed towards providing a device and a method of operating the device which enables one to characterize a viscoelastic material simply and efficiently.

SUMMARY OF THE INVENTION

The apparatus of the instant invention comprises a block containing two capillaries of unequal length but of the same diameter. A gear pump is connected to this block so that the material under study may be pumped through the two capillaries in series. The temperature of the block and hence the temperature of the material flowing therethrough is controlled by suitable isothermal and adiabatic jackets. Means are provided for determining the pressure drops across the two capillaries and these pressure drops may be ascertained by gauge readout or, in the alternative, they may be automatically printed out. Knowing the values of these pressure drops, the temperature and the shear rate established by the gear pump, the rheological characteristics hereinabove described may be readily determined. This latter determination may be accomplished by use of a computer which may also be equipped with automatic printout.

If one employs a constant rate of shear D (this may be obtained by the use of a gear pump) and a capillary with a given radius ($r$) under constant temperature conditions, the pressure drops obtained are proportional to the length of the capillary at that rate of shear. The proportionality constant is a measure of the viscosity.

Mathematically the above may be reduced to the following equation:

$$\Delta P = A + B(L/r)$$

where

A is a measure of the shear modulus G; namely, $$\frac{(\eta \times D)^2}{G}$$

$\eta$ is the viscosity;
B is equal to $2\eta D$ (neglecting minor corrections due to viscous losses encountered by any liquid as a result of velocity gradients near the entrance to a capillary);
$\Delta P$ is equal to the measured pressure drop across the capillary; and
D is the constant rate of shear at the wall of the capillary.

By using two capillaries of different lengths and by obtaining the pressure drops across each of the capillaries, e.g. $\Delta P_1$ and $\Delta P_2$, one can compute G and $\eta$ by solving the following two equations simultaneously:

(2) $$\Delta P_1 = \frac{(\eta \times D)^2}{G} + 2\eta D(L_1/r)$$

(3) $$\Delta P_2 = \frac{(\eta \times D)^2}{G} + 2\eta D(L_2/r)$$

$L_1$ and $L_2$ being the lengths of the two capillaries. As indicated hereinabove, these computations may be made automatically and the result printed out by use of a suitable computer.

Thus, it is a specific object of the instant invention to provide a device which is able to establish the rheological characteristics of a plastic material.

Another object of the invention is to provide a device which is readily adaptable for continuous monitoring and which may be used in an in-stream capacity; that is, the material being monitored is normally not subjected to degradation during the course of the test work and is returned to the mainstream upon passing through the device.

These and further objects as well as a fuller understanding of the invention may be had by reference to the accompanying detailed description and the drawing in which:

BRIEF DESCRIPTION OF THE FIGURE

The drawing illustrates a schematic representation of the device of the instant invention.

Turning to the figure in detail, reference numeral 2 indicates the conduit containing the material to be monitored. The material contained therein is flowing in the direction of arrow a. Conduit 2 is provided with a flange 4 at its end which is adapted to receive a matching flange 6 situated on the main inlet 7 of the test device, which is designated generally at 5. A gasket 8 is positioned between flanges 4 and 6 to maintain a liquid tight joint therebetween. The material enters device 5 through the conduit 10 and a portion of it is then forced through the inlet 13 as indicated by the arrow designated b into a first tube 14. Tube 14 terminates at its distal end in capillary 16. Capillary 16 inturn terminates in a second longer tube 18 whose outlet 21 is joined via a coupling 20 to the inlet of a gear pump 22. It is to be understood that the flow through the gear pump requires that pressure be maintained in conduit 10 by the valve 36. Suitable pressures may be in the range of about 100 p.s.i. to 1000 p.s.i. depending upon the material being monitored. The material entering the suction side 24 of pump 22 is pumped in the direction indicated by arrow c to the discharge outlet 26 of the pump. Pump 22 which may suitably be of the type manufactured by the Zenith Company is sized so as to produce a constant shear rate at the capillary wall somewhat in the range of 750 to 2000 reciprocal seconds, which is similar to extrusion conditions. From outlet 26 the material is pumped through a tube 28 which terminates in a second capillary tube indicated by reference numeral 30. Capillary 30 is designed to have the same diameter as capillary 16; however, it has in the preferred embodiment an $L/r$ ratio in the range of from about 16 to 40 and preferably about 20. Capillary 16 should have an $L/r$ ratio of .05 to .2. Capillary 30 terminates at the inlet of tube 32 which in turn communicates with outlet 34 leading back to the main flow stream in conduit 10. Pressure gauges 40 and 42 which may be of the differential pressure cell type made by International Resistance Company (and designated by their Model No. 70-2907) are employed to determine the pressure drops $\Delta P_1$ and $\Delta P_2$ encountered across capillaries 16 and 30 respectively. Thermocouples 44, 58 and 38 are provided to enable temperatures at various locations in the apparatus to be ascertained. A suitable temperature control system which may be in the form of a plurality of channels 52 adapted to receive a heat transfer fluid is provided to insure that the temperature of the material flowing through the apparatus may be maintained at a desired constant level. The flow of heat transfer fluid through channels 52 may be automatically controlled through the use of suitable instrumentation (not shown).

Signals proportional to the pressures discerned by differential pressure gauges 40 and 42 are transmitted via the lines 46 and 54 respectively to voltmeters 48 and 50, which may be of the digital type and which are in a preferred embodiment calibrated directly in pounds per square inch. These pressures may then be used to determine G, the shear modulus, and $\eta$, the viscosity, of the material under test by utilizing the Equations 2 and 3 hereinbefore discussed. In the alternative, as earlier indicated, the signals from pressure differential gauges 40 and 42 may be fed to a computer (not shown) which is programmed to solve Equations 2 and 3 simultaneously and which will continuously print out the calculated values of the material's shear modulus and viscosity under the imposed test conditions.

In the preferred embodiment the time required for the material under test to pass through the apparatus will be in the range of about 8 to 20 seconds. By reason of this short residence time, measurements may be made at temperatures up to about 500° F. without appreciable degradation taking place. Instruments currently in use for characterizing viscoelastic flow are at present limited to maximum operational temperatures of about 400° due to their longer residence times. If higher temperatures are used in these instruments, serious degrading of the material will be encountered and the obtained data does not present a true picture of the rheological properties hereinbefore discussed.

While the operation of the device has been described in its normal mode of operation, it will be readily apparent to those skilled in the art that the apparatus can also be used to study the changes in G and $\eta$ when a viscoelastic material is subject to degradation. For this type of determination valve 36 which is normally partially opened is closed. The apparatus is then run in the identical manner as just described. A particular temperature at which it is desired to obtain degradation data is selected and maintained by the fluid in channels 52. It will be appreciated that since the same material is constantly being pumped around through the test device, a gradual degrading of the material will occur. This is due to the breaking down of the long chain molecules comprising the material into smaller ones. During the course of this degradation, pressure drops are obtained as before. The resulting data can then be used to obtain correlations showing the changes in viscosity and shear modulus with increasing degradation. Such information is, of course, extremely useful in predicting how a particular material will behave in various fabrication processes such as extrusion, injection molding, blow molding and the like. It is also valuable in determining the effectiveness of additives which may be incorporated in the material to retard degradation.

It should be understood that the specific structure herein illustrated and described is intended to be representative only, as certain changes may obviously be made therein without departing from the clear teachings of the disclosure. For example, pump 22 need not be a gear pump since any pumping means capable of delivering a constant output would be suitable. Similarly, the pumping means need not be located between the capillary tubes but would also function in the desired manner if it were placed either before or after both of said tubes. Furthermore, any other means which would insure that a uniform pressure differential exists between the inlet and the outlet portions of the device of the instant invention would also suffice. Also, it is not necessary that both capillary tubes be of the same diameter since two pumping means could be used whereby a constant and equal rate of shear could be maintained at the walls of each of the capillaries.

What is claimed is:

1. A rheometer for viscoelastic material which comprises in combination, a first capillary tube having a uniform diameter throughout its length, a second capillary tube having a uniform diameter throughout its length in series communication with said first capillary tube, one of said tubes being elongated, gear pump means for forcing viscoelastic material at a known constant rate of shear through said first and second capillary tubes independent of the viscosity of the viscoelastic material being tested, and a pair of independent pressure measuring means for separately measuring the pressure drop across each of said capillary tubes.

2. The rheometer of claim 1 wherein said first capillary and said second capillary have the same diameter and said second capillary has an $L/r$ ratio in the range of about 16 to about 40.

3. A rheometer for a viscoelastic material which comprises in combination:

(a) a first conduit portion having an inlet and an outlet end;

(b) valve means associated with said outlet end;

(c) a body member laterally affixed to said first conduit portion, said body member defining an inlet tube having one end in communication with said conduit portion, a first capillary tube having one end in communication with the other end of said inlet tube, a fluid passage having one end in communication with the other end of said capillary tube, a second capillary tube having one end in communication with the other end of said passage and an outlet tube having one end in communication with the other end of said second capillary and its other end in communication with said first conduit portion;

(d) pumping means in communication with said passage for pumping said viscoelastic material from said conduit portion to a point proximate to the outlet end of said conduit portion; and (e) pressure measuring means for separately measuring the pressure drop encountered across said first capillary tube and said second capillary tube.

4. The rheometer of claim 3 wherein said pumping means is a gear pump and temperature control means are operatively associated with said body member whereby the temperature of said viscoelastic material may be controlled as it is pumped through said body portion.

5. The rheometer of claim 3 wherein said pressure measuring means comprises a pair of pressure differential cells which convert pressure differential to an electrical signal and a pair of digital voltmeters for receiving the signals from said pressure differential cells.

6. The rheometer of claim 3 wherein the inlet end of said conduit portion is provided with a flange means whereby said rheometer may be mounted to a main line containing the viscoelastic material.

References Cited

UNITED STATES PATENTS

| | | |
|---|---|---|
| 1,633,352 | 6/1927 | Tate. |
| 2,700,891 | 2/1955 | Shafer. |
| 2,934,944 | 5/1960 | Eolkin _____ 73—55 |
| 3,138,950 | 6/1964 | Welty et al. |
| 3,375,704 | 4/1968 | Thompson, Jr., et al. |
| 3,468,158 | 9/1969 | Chien _____ 73—55 |

H. C. POST III, Assistant Examiner

LOUIS R. PRINCE, Primary Examiner